Oct. 19, 1926.
T. MIDGLEY
1,603,857
METHOD FOR BUILDING A SUCCESSION OF LAMINATED ARTICLES
Filed Dec. 3, 1921    4 Sheets-Sheet 1
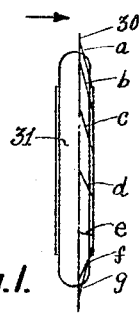
Fig.1.
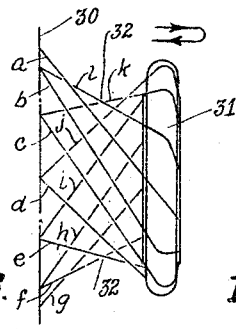
Fig.3.
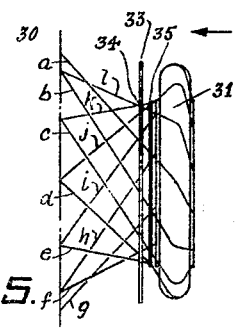
Fig.5.
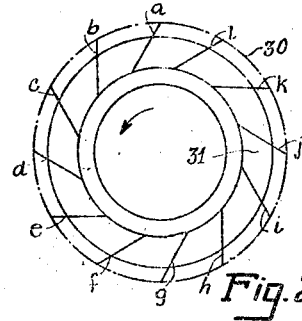
Fig.2.
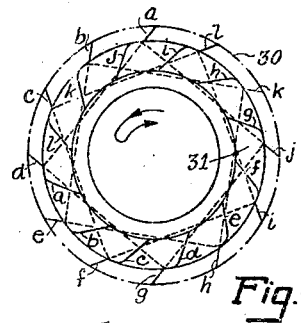
Fig.4.
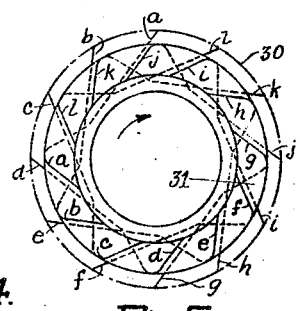
Fig.6.
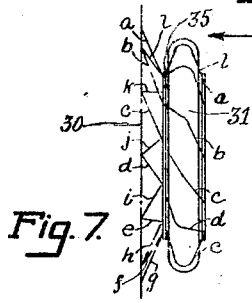
Fig.7.
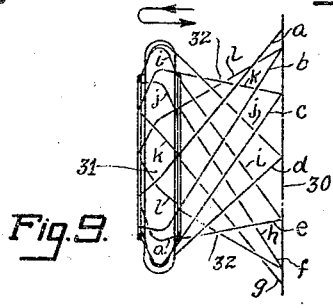
Fig.9.
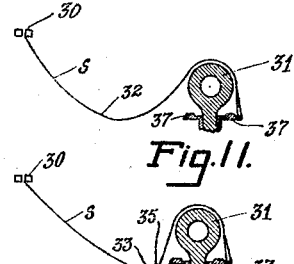
Fig.11.
Fig.12.
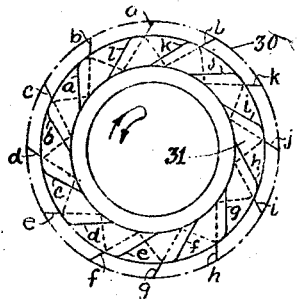
Fig.8.
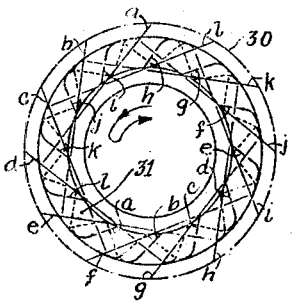
Fig.10.
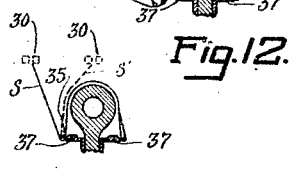
Fig.13.
INVENTOR
Thomas Midgley
BY Edward C Taylor
ATTORNEY Oct. 19, 1926.
T. MIDGLEY
1,603,857
METHOD FOR BUILDING A SUCCESSION OF LAMINATED ARTICLES
Filed Dec. 3, 1921    4 Sheets-Sheet 2
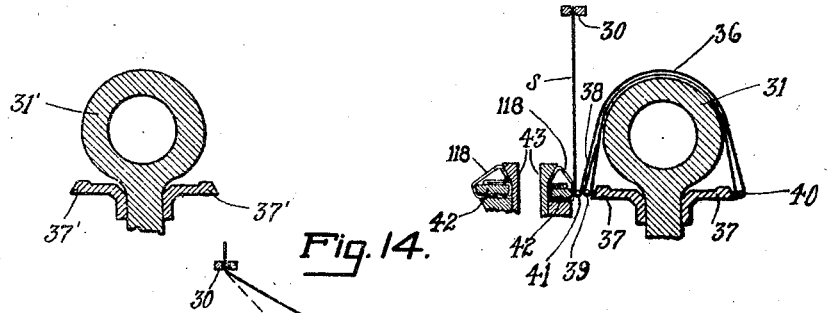
Fig. 14.
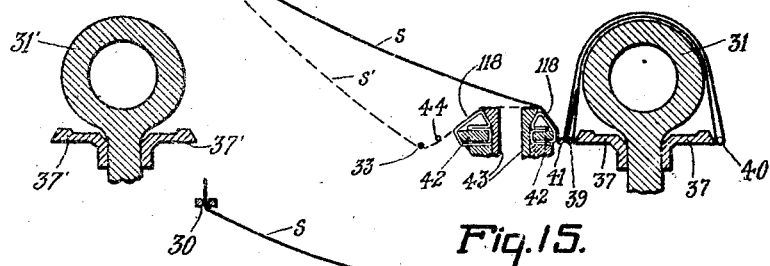
Fig. 15.
Fig. 16.
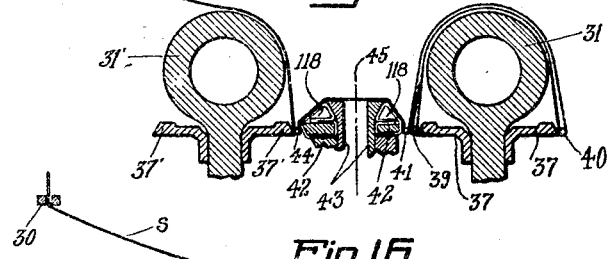
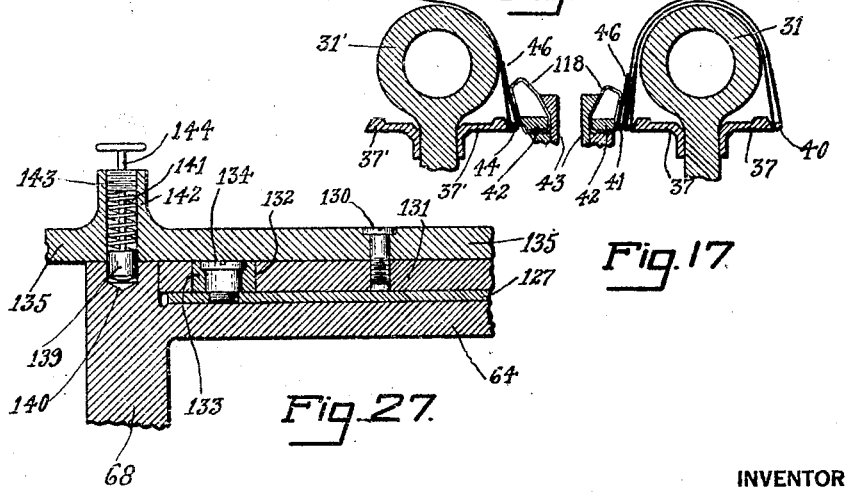
Fig. 17
Fig. 27.
INVENTOR
Thomas Midgley
BY
ATTORNEY Oct. 19, 1926.
T. MIDGLEY
1,603,857
METHOD FOR BUILDING A SUCCESSION OF LAMINATED ARTICLES
Filed Dec. 3, 1921  4 Sheets-Sheet 3
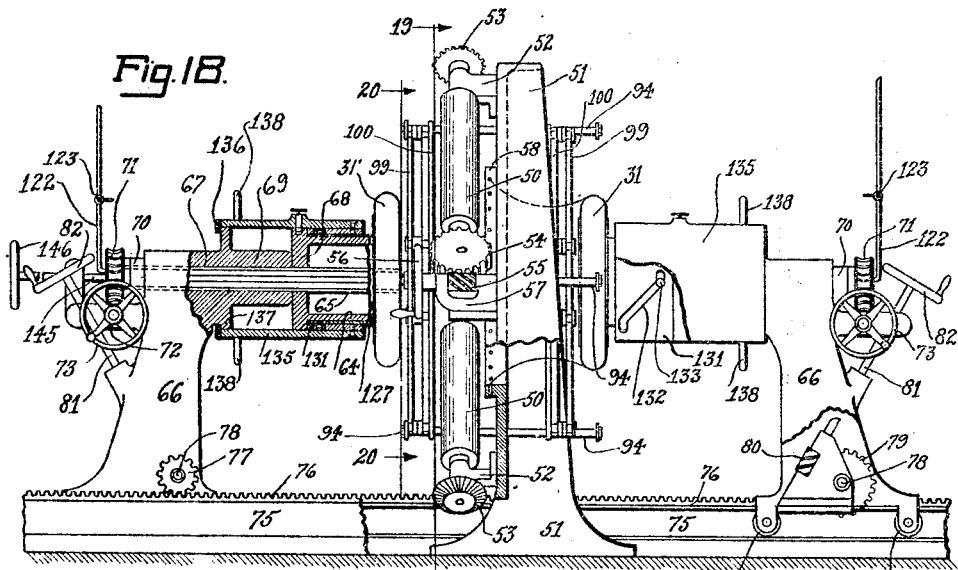
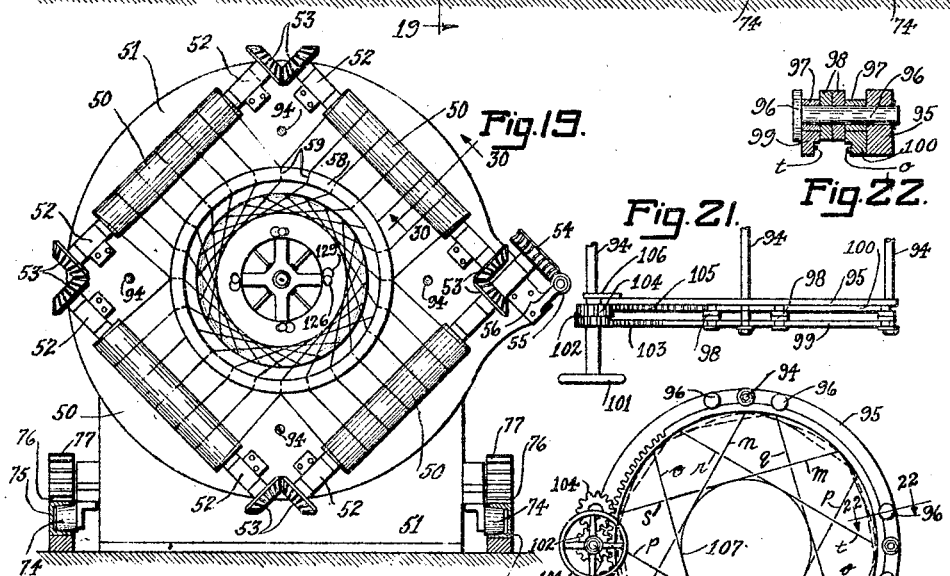
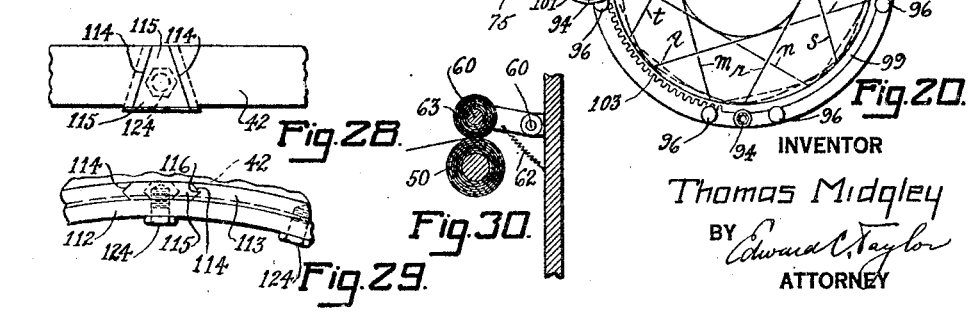
INVENTOR
Thomas Midgley
BY Edward C. Taylor
ATTORNEY

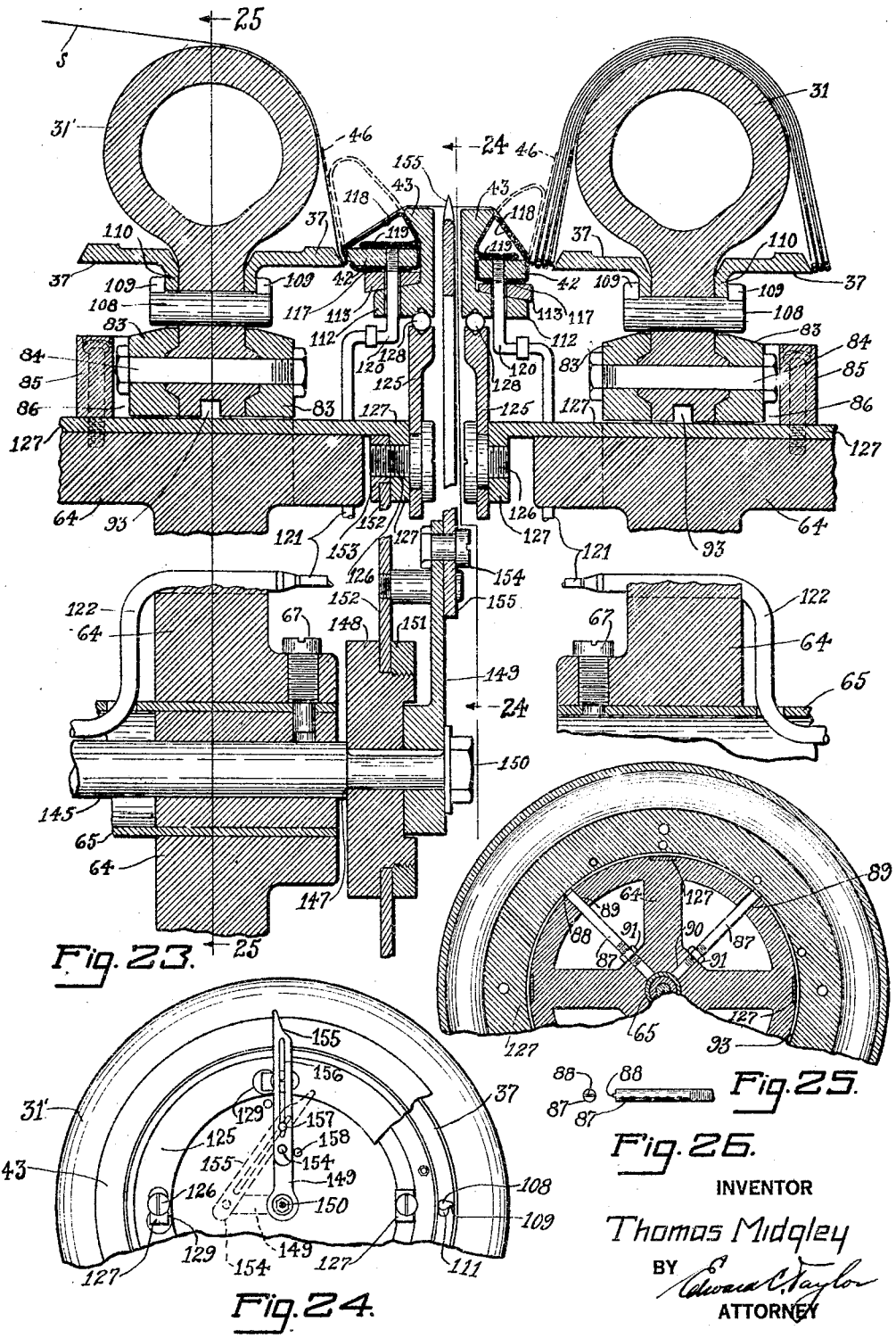

Patented Oct. 19, 1926.

1,603,857

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD FOR BUILDING A SUCCESSION OF LAMINATED ARTICLES.

Application filed December 3, 1921. Serial No. 519,583.

My invention relates to the building of laminated articles such as tire casings, and has for one object the economical and accurate productions of such articles in succession. It has for a further object the building of a succession of carcasses under tension from a supply of building material without disturbing the tension conditions in transferring from the building of one carcass to the construction of a succeeding one. It has for a further object the completion of one carcass and the starting of a succeeding carcass simultaneously and by the same series of operations. It has for a further object the elimination of scrap material in the operation of transferring from the building of one carcass to that of another, and the effective utilization of all material throughout the building of the successive carcasses. It has for a further object the building of a succession of casings under economical conditions from a circumferential series of separate cord members and the transferring of the members from one building support to another rapidly and without waste and without disturbing their conditions of tension and location. It has for a further object the transferring of a circumferential series of cord members from one carcass to a succeeding one without the necessity of handling the cords individually. It has various other and further objects which will appear and be inferred from the following description and claims.

My invention will now be described in connection with the accompanying drawings, in which Fig. 1 is a diagrammatic side view of an annular building support, in the form of a toric core, with a series of twelve cord members being laid thereon according to the preferred manner of practicing my invention, the cords being shown in their initial position;

Fig. 2 is a diagrammatic view from the right in Fig. 1;

Figs. 3 and 4 are views similar to Figs. 1 and 2 illustrating a later stage of the laying of the first ply;

Figs. 5 and 6 are similar views showing the application of a bead anchorage between the first and second plies;

Figs. 7 and 8 are similar views illustrating a later position;

Figs. 9 and 10 are similar views illustrating a position corresponding to Figs. 3 and 4 but in the laying of the second ply;

Figs. 11, 12 and 13 are diagrammatic views showing the core and guiding circumference in the positions of Figs. 3, 5 and 7 respectively, but illustrating a portion of the surface bounded by the series of cord members instead of the individual cord members;

Fig. 14 is a diagrammatic view illustrating the initial stage in the transferring of the series of cord members from one building support to another to simultaneously complete the construction of the first carcass and start the building of a second;

Figs. 15 and 16 are views similar to Fig. 14 showing successively later stages in the transfer;

Fig. 17 is a view similar to Figs. 14, 15 and 16 showing the parts shortly after the severing of the cord members and also showing one manner of securing in the successive carcasses the free ends formed by the severance;

Fig. 18 is a side elevation, partly in section, of an apparatus by which carcasses may be built successively upon a series of cores by the method illustrated diagrammatically in the preceding figures;

Fig. 19 is a section on line 19—19 of Fig. 18;

Fig. 20 is a partial section on line 20—20 of Fig. 18;

Fig. 21 is a top view of the mechanism shown in Fig. 20;

Fig. 22 is a section on line 22—22 of Fig. 20;

Fig. 23 is a fragmentary sectional view of the two cores shown in Fig. 18 and the transfer mechanism associated therewith, the parts being illustrated in the position shown diagrammatically in Fig. 16;

Fig. 24 is a partial section on a reduced scale on line 24—24 of Fig. 23, some parts being shown broken away;

Fig. 25 is a partial section on a reduced scale on line 25—25 of Fig. 23 showing the supporting mechanism for the core;

Fig. 26 is a detail, both side and end view, of an element of the core holding support;

Fig. 27 is a partial section on a larger scale of parts shown in Fig. 18;

Fig. 28 is a fragmentary detail of a wedge ring shown in section in Fig. 23;

Fig. 29 is a side view of the parts shown in Fig. 28; and

Fig. 30 is a partial section of a slightly modified form of mechanism, taken on line 30—30 of Fig. 19.

I have discovered that the conditions of tension and position of tire building material can be maintained during the transfer from the building of one carcass to the building of a succeeding one if the material is supplied in substantially continuous length from a supply from which it is delivered under a steady tension, and the building of a carcass started before the material is severed from the preceding one. I have further discovered that the construction of a succession of tire carcasses can be greatly facilitated and improved if the material is supplied in circumferentially complete form and is held against displacement between the built-up carcass and the supply and then severed between the built-up carcass and the portion so held, and the construction of a second carcass started with the portion of the material so held as a basis. By this method of procedure the conditions of tension and position of the material in each carcass are preserved after the severance and scrap material eliminated, as all the material delivered from the supply is utilized effectively in the carcass construction. I have further discovered that in building cord tire carcasses from a circumferentially complete series of cord members which are laid in successive plies across the carcass it is possible to proceed from the building of one carcass to that of a succeeding one without severing the cords until the series of cord members are safely secured in the second carcass, and so to avoid any danger of these members becoming misplaced or tangled and also the necessity of handling the elements individually after their severance from the first carcass.

In order that my invention may be readily understood I will describe it in connection with the method of tire building which I prefer to use, and with which my method of transferring from the building of one tire to another is especially applicable. The general tire building method referred to has been described and claimed in an application filed by me March 1, 1921, bearing Serial No. 448,891. It will be understood, however, that while the preferred method of building individual tires and the method of building a plurality of tires in succession have especial applicability to each other, the method forming the present invention is in one broad aspect independent of the particular manner of building the individual tire carcasses. The preferred manner of building the individual tire carcasses will now be described, in order that the later description of the method of passing from one tire to that of another may be better understood.

According to the preferred manner of constructing the individual tire carcasses I make use of a circumferential series of preferably rubberized cord members, which may be either round cords or flat strips and which are preferably sufficient in number to form a complete layer or ply, although shown in Figs. 1 to 10 as only twelve in number for purposes of clearness. This series of cord members is guided in constantly taut condition, under such tension as may be desired, through a circumference 30 at which any suitable guiding means may be provided. The inner ends of the cord members are secured adjacent one side of a circular tire building support such as a flat drum, spaced bead supports, or, in the usual and preferred case, an annular core 31 of the well-known convex transverse form, arranged coaxially with the guiding circumference. In the diagram the twelve cord members shown are lettered from $a$ to $l$. In Figs. 1 and 2 the cord members, building support, and guiding circumference are shown in the positions which they occupy at about the start of the laying of the first ply. As the cord members in the usual tire carcass are angularly disposed, and as the members in succeeding plies cross each other at an angle, the method of tire building herein described is preferably adapted to accomplish this end. For this reason the cord members, in the initial position shown in Figs. 1 and 2, are arranged at substantially the angle they are to assume in the built-up carcass.

Starting with this initial position the cord members are laid across the core by a relative axial motion between the core and the guiding circumference. It is generally simpler to produce this relative motion by moving the core axially, but whether this motion is given by the core or the guiding circumference or both is not material. For convenience all motion will be referred to as being given to the core. To lay the cords upon the core by the relative axial motion referred to, the core is moved from the position of Fig. 1 to that of Fig. 3 in the direction of the arrow in Fig. 1. During this motion the core is rotated in the direction of the arrow in Fig. 2 so as to draw the cord members across the core in the diagonal lines in which they were started. In the position of Figs. 3 and 4 the cord members individually lie straight between the guiding circumference and the core, but due to their angular position the surface defined by the series of elements is curved and of the nature of what is termed by mathematicians a warped or ruled surface of revolution. The nature of this surface is apparent even with the small number of cord members shown in the drawings, and when a number of cords sufficient to form a complete ply is used the surface is quite well defined by the spaced cords and presents a constricted or inwardly curved portion of reduced circumference indicated at 32.

An encircling bead anchorage may be applied to this constricted portion with the elements in the position of Fig. 3 if desired, provided the axial motion and the rotation have been carried to a sufficient extent to reduce the circumference 32 enough to permit of the ends of the anchorage being joined around it. It is preferred in the present case to constrict artificially the surface defined by the series of cord members by some encircling means 33, similar in operation to an iris diaphragm, at a point 34 (Fig. 5) closer to the side of the core than the point of minimum circumference of said surface in its natural condition. This lessens the shifting of the anchorage to the bead position after it has been placed around the cords, and improves the lay of the cords upon the core. In Figs. 5 and 6 the constricting means has been indicated diagrammatically only, but a suitable device for this purpose will be described later. The shifting of the point of minimum circumference of the cord surface, by causing the spaced individual cord members to lie in directions which are not straight lines or the shortest distances between the guiding circumference and their points of contact with the core, tends to increase the length of the cord members. This condition may be met during the constricting operation of the means 33 by paying out the required excess lengths of the individual cord members through the guiding circumference, or by moving the core a slight amount in the direction of the arrows in Figs. 5 and 6 while holding the cord members stationary at the guiding circumference. The latter method is indicated in the drawings by the difference in the relative positions of the core and the guiding circumference in Figs. 3 and 4 and in Figs. 5 and 6. With the cord members so constricted close to the side of the core the annular bead anchorage 35 may be placed around them, as by splicing, welding, soldering or clipping together the ends of a wire of a length corresponding to the circumference of the desired bead anchorage.

With the cord members of the first ply thus laid across the core and passed through the anchorage 35 the constricting device 33 is removed and the core moved towards the guiding circumference. As the constriction of the series of cord members is preferably carried far enough to render easy the application of the encircling anchorage it is desirable in order to avoid slackness in the cords to draw them back through the guiding circumference as the constricting device is being removed. An equivalent result could be attained by straightening out the cords as by either rotating the cord slightly or moving it axially towards the position of Fig. 3 or both. The motion of the core towards the guiding circumference is accompanied by a rotation in the reverse direction to that given on the outward or cord-laying stroke, in order to preserve the cords in their angular position while the excess length of the cords necessary to permit of the application of a bead anchorage is being drawn back in taut condition through the guiding circumference.

When substantially the position of Figs. 7 and 8 has been reached the rotation of the core is changed so that it is once more in the same direction as on the initial cord laying stroke, and the core is moved through the guiding circumference to the position of Figs. 9 and 10, which corresponds to that of Figs. 3 and 4 except that the core is at the other end of its axial reciprocation and that the second ply of cord members has been laid across the core. As the core moves from the position of Fig. 5 towards and through the guiding circumference the walls of the trough defined by the individual cord members in which the anchorage 35 lies (see also Figs. 12 and 13) become gradually steeper, and the trough itself is finally changed into a fold of said cord members so that they pass around the anchorage and back upon the layer of cords already upon the core, as shown in dotted lines in Fig. 13. This change in the character of the surface defined by the series of cord members carries the anchorage 35, which as applied is usually at a slight distance from the side of the building support, to a position contiguous to the support. The individual cord members are preferably maintained under uniform tensions, so that the anchorage will take a central position with respect to the core axis without the necessity of using any centering device.

The operations of constricting the series of cord members and applying a bead anchorage are repeated after the core reaches the position of Fig. 9, and the reciprocations of the core through the guiding circumference and the application of anchorages as described above are carried on until the desired number of plies have been laid on the core. The approximate shape of the surface S defined by the individual cord members is best shown in Figs. 11, 12 and 13, which correspond with the positions of Figs. 3, 5, and 7 respectively. In Figs. 11, 12 and 13 the angular position of the cords has been disregarded, and the surface above referred to is indicated for clearness as if it were a true continuous surface. It is clear however from this description that the desired ply building operations are carried out by the individual movements of the cord members manipulated in an ordered circumferential series.

In Figs. 14, 15, 16 and 17 are shown diagrammatically four successive stages in the preferred manner of transferring the series of cord members from a built-up carcass to a succeeding building support for the construction of a second carcass. In these views the built-up carcass 36 is shown as supported upon a core 31 provided with building flanges 37 (also shown in Figs. 11, 12 and 13) serving to hold the bead edges of the carcass in positions preferably extending slightly outwardly from the sides of the core. The core upon which the next succeeding carcass is to be built is indicated at 31', and is provided with building flanges 37'. The cords are shown for clearness as a continuous cord defined surface S as in Figs. 11, 12 and 13. The carcass upon core 31 is shown as composed of two plies of material only as this clarifies the illustration and as the addition of further plies, as is contemplated in the carcass building operations, would not change the method of procedure. The first ply is anchored by folding at 38 around an annular anchorage 39, and the material is laid across the core, folded back around an annular anchorage 40 and is held restricted to the bead diameter at the first side of the tire by an anchorage 41. From thence the cords extend to the guiding circumference 30. Fig. 14 illustrates the positions of the various parts after the completion of the laying of two plies (which for the present description will be considered as a complete carcass) and before the various operations of transferring the material to the other core 31'. It may be pointed out here that the carcass building steps illustrated in Figs. 1 to 13 show the building of a carcass on a support corresponding to the core 31' in Figs. 14 to 17, but the operations are the same whichever core is being operated upon, the only difference being in the direction in which the core makes its initial passage through the guiding circumference.

The core 31 and the guiding circumference are shown in Fig. 14 as in a position where the core defined surface forms a plane parallel to the core, or in other words where the edge of the built-up carcass is directly within the guiding circumference. This exact position is not essential, although it renders the parts more accessible for the clamping of the series of members to the anchorages as will now be described.

To clamp the cord members various devices may be used but preferably, and as shown, each core is provided with a clamping ring 42 secured as on a disk 43 which may be mounted for movement toward or away from its core in any desired way, a convenient mounting being described later. The ring 42 is pressed against the cord members folded around the anchorages 39 and 41, clamping them firmly in place against the building flange 37 and holding them so that there will be no danger of their becoming displaced when the series is severed between the cores.

The core 31 and the guiding circumference 30 are then given a relative axial movement substantially as shown in Fig. 15, the angular position of the cord members being maintained by a simultaneous relative rotation in the same manner as in the building up of the carcass. This motion causes the cord members to extend from the bead of the built-up carcass on core 31 over clamping rings 42 to the guiding circumference, and to define between the clamping rings and the guiding circumference a surface of substantially the shape shown at S in Fig. 15. This surface is now constricted between the core 31' and the nearer clamping ring 42 to slightly less than the bead circumference by the constricting means 33 previously referred to. An annular anchorage 44 may now be applied about the series of cord members and the constricting means removed, the cord members being preferably maintained under tension during these operations so that they will extend in taut condition from the guiding circumference through the anchorage 44, across the peripheries of disks 43 and into the built-up carcass on core 31.

Core 31' is now brought against the inside of said surface S as shown in Fig. 16, causing the individual cord members of the circumferential series to be laid against the core and the anchorage 44 to be pressed in a bight of the core members between flange 37' and ring 42. The cord members now extend in taut condition and in circumferentially complete form from the bead of the built-up carcass on core 31 to the bead line position of the inchoate carcass which is thus being started on core 31', and are securely clamped against displacement adjacent each carcass. The series of cord members may now be severed in a circumferential line substantially in the plane indicated at 45 in Fig. 16, the clamping of the members at the bead line preventing any displacement or loss of tension in either carcass. The severing of the cord members may be accomplished in any desired manner, as by a hand knife, or by mechanism associated with the clamping rings such as will be described later.

Another way in which the position of Fig. 16 can be reached is to bring core 31, after the application of the anchorage 44, back towards the guiding circumference until the anchorage has been drawn close to the adjacent ring 42 and lies substantially in the plane of the guiding circumference. The core 31' is then brought into adjacency with core 31 and the clamping rings 42 clamped against the bead flanges 37. The cores may now be moved simultaneously to the position of Fig. 16, and the cutting of the cords proceeded with as before. This method presents the advantage that the cords are not liable to any distortion on account of the displacement of the cord defined surface by core 31', the cords being in this case laid upon the core as in the carcass building operation.

It remains to fold the free ends 46 of the cord members formed by the severance back against the material of each carcass as shown in Fig. 17, so that the anchorage 41 last applied to the built-up carcass on core 31 and the initial anchorage 44 of the inchoate carcass on core 31' will be secured in their respective carcasses by being enclosed in loops of the cord members. The folding of the free ends of the individual cords may be done by hand, or by the use of expansible annular devices which will be described later and generically indicated in the present figures by 118. Adhesion of the folded-back ends 46 to the cord members in the body of the carcasses may be insured by the rubber carried by the cord members or by the use of a suitable cement. With the ends thus folded back upon the material in the body of the carcasses the carcass on core 31 is complete as far as these described operations are concerned, and may, together with the supporting core, be removed for the application of suitable covering materials such as the usual tread and sidewalls. Core 31', with the inchoate carcass just started thereon, may now be moved to the positions of Fig. 3 and succeeding figures and the carcass built up as previously described. The pressure of the clamping ring 42 is preferably maintained until one ply has been completely laid and the second ply started, so that the tension of the cord members cannot cause them to slip around anchorage 44. Succeeding cores may be brought into operation to replace alternately the core in position 31 and that in position 31', the series of building cords being supplied always from the same source and successive transfers being accomplished as described above without the necessity of dealing with individual cords and without losing the position or tension of the cords during the changes from one core to another. Thus I provide, and I believe I am the first to do so, a method of building successively any desired number of carcasses without disturbing the tension conditions of the building material during the change from one carcass to another.

I will now proceed to describe an apparatus by which the operations previously described may be carried out. The apparatus herein shown is partly in the nature of hand operated guides for positioning the cord members, a more completely automatic mechanism for this purpose being described and claimed in a copending application filed by me March 27, 1922, Serial No. 547,081. In the apparatus shown in the present case the cord members are supplied on reels 50, four in number as shown, journaled on an upright frame 51 in bearings 52. The reels are connected together for simultaneous rotation by four sets of bevel gears 53, and one of the reels carries a worm wheel 54, which may be rotated through a worm 55 by a hand wheel 56 the shaft of which is journaled in a bearing 57 on frame 51. By turning the handwheel the reels can be simultaneously rotated in either direction to pay out or rewind cord members which may be mounted thereon.

Also secured in frame 51 is a circular guide 58 having a circumferential series of guiding apertures 59, which may be fitted with rollers or other suitable anti-friction devices if desired. This guide corresponds in function to the guiding circumference 30 previously referred to. The cord members wound on reels 50 pass radially inwardly through the apertures 59 and their inner ends may be attached to either of a pair of cores 31 and 31', mounted as will presently be described. In case the cords are rubberized and wound on the reels with a separating liner a liner wind-up roll 60 (Fig. 30) may be pivoted adjacent each reel in a bracket swinging at 61 on the main frame and drawn towards reel 50 as by a spring 62. These wind-up rolls will be rotated by friction from the reels 50 and will wind up the liner 63 which separates the turns of the cords on the reels.

As the manner in which the two cords 31 and 31' are mounted are the same except in certain particulars which will be hereinafter referred to a description of one will suffice for both. Each core is carried on a head 64 carried by a tubular shaft 65 journaled in a support 66. The head 64 is secured to the shaft 65 in any suitable manner, as by a set screw 67, and has an integral portion 68 abutting against the end of the bearing 69 through which the shaft 65 passes, thus restraining the core from axial movement in a direction away from the center of the machine. At the end of shaft 65 remote from the core there is provided a collar 70 to prevent axial movement of the shaft and core in a direction towards the center of the machine. To provide for rotation, under controlled conditions, of shaft 65 and consequently the core, a worm wheel 71 is fixed to the end of the shaft and meshes with a worm 72 carried on the support 66. By this means either core can be rotated to the extent desired by turning the corresponding handwheel 73, and will be held in rotated position by the well known irreversible character of a worm drive.

Provision is also made for moving either core axially. For this purpose the supports 66 are each provided with rollers 74 running in grooved tracks 75. Associated with each track is a stationary rack 76, with which meshes a pinion 77 fast on a shaft 78 journaled in the support. Also fast to each shaft 78 is a worm wheel 79 driven by a worm 80 on a shaft 81 journaled in the support and carrying a hand wheel 82 at its upper end. By rotating either one of these hand wheels 82 the coresponding core may be moved axially from one side to the other of the annular opening in guide 58.

The cores as shown are of the well known collapsible or segmental type to permit of their being removed from the tire casing, and are composed of a plurality of segmental sections held in place by binder rings 83 secured by bolts 84. These bolts are utilized in the present case to hold the cores against rotation on heads 64 in the following way. Secured on each head 64 is a ring 85 having at intervals circumferentially recesses 86 into which the heads of bolts 84 fit. Thus the rings serve as a stop to assist in positioning the cores axially and as a means to secure the cores to the heads for rotation therewith. In order to secure the cores axially rods 87, provided with flattened ends 88, are slidable in holes 89, 90 in the head, and may be forced outwardly by nuts 91 engaging a threaded portion of the rods and bearing against the hub of the head as shown in Fig. 25. When in their outer position the flattened ends of these rods enter grooves 93 in the inner periphery of the core.

The constricting means indicated generally at 33 in the diagrammatic views will now be described in one embodiment. Two such means are provided, one at either side of the guide 58, but as they are similar a description of one will suffice. Secured in frame 51 are rods 94 upon which is slidable a ring 95. At intervals around this frame are headed pins 96 supporting rollers 97 separated by spacing collars 98. These rollers support a pair of rings 99 and 100 which are free to rotate within the series of rollers. Sliding on one of the rods 94 is a handwheel 101 the tubular shaft of which carries a pinion 102 meshing with teeth 103 on a segment of ring 99. A second pinion 104 wide enough to mesh with pinion 102 and also with teeth 105 on a segment of ring 100, is journaled in a bracket 106 secured to ring 95. Suitable collars, not shown, may be provided to insure that the gears 102 and 104 will move axially with ring 95. By this means the rings 99 and 100 may be rotated simultaneously in opposite directions by turning the handwheel 101. Secured to the rings at their ends are flexible wires, conveniently eight in number, each wire being connected at one end to ring 99 and at the other end to ring 100. The wires are lettered from $m$ to $t$ in the drawings, and are shown in dotted lines in their inoperative position and in full lines in their constricted position. The rotation of the rings 99 and 100 in opposite directions will serve to enlarge or decrease the size of the circle 107 bounded by the series of wires, the series operating on the principle of an iris diaphragm, and without substantial circumferential movement of the wires on the cord surface $s$.

The apparatus which was diagrammatically indicated in Figs. 14 to 17, and which functions to assist in the transferring of the series of cord members from one core to the other, will now be described, particular reference being had to Fig. 23. The building flanges 37 are secured to the core by pins 108 extending through the core and having segmental heads 109 adapted to engage the radial portion 110 of the building flanges. By rotating the pins their segmental heads will pass through slots 111 in the flanges (Fig. 24) to permit of the removal of the latter. The clamping rings 42 previously referred to which are arranged to press the bead portions of the carcasses on the cores against their building flanges, are in the embodiment shown also used for supporting expansible annular tubes for turning the free ends of the cord members back against the sides of the carcass structures. In referring previously to the clamping rings they were described as being carried on disks 43. In the embodiment shown in Fig. 23 these disks have beveled portions 112 upon which are fitted rings 113 tapered on their inner circumferences to fit the bevels 112. Each ring 113 is split as at 114 (Figs. 28 and 29) to permit of expansion of the ring as it is driven onto the bevels, and the gap is closed by a wedge-shaped filling piece 115 preferably having grooved contact with the ring at the sides of the gap as shown at 116 in Figs. 28 and 29. By driving the tapered ring 113 axially it is expanded towards the clamping ring 42, and in its expanded position securely holds and seals the overlapping edges 117 of an annular bag 118 positioned outside of and enclosing the clamping ring. This bag may be made expansible by constructing it out of elastic material, but preferably the necessary expansion is obtained by folding the bag material as at 119. When compressed air or other fluid under pressure is introduced within the bag the fold is straightened out and the bag expanded to substantially the position shown in dotted lines in Fig. 23, thereby forcing the cut ends 46 of the plies of tire building material back against the carcass portions previously laid on the core. Provision is made for introducing fluid within the bags by pipes 120 extending through holes in rings 42 and 113 and the tapered portion 112 of the disks 43, and connected by flexible tubes 121 to pipes 122 extending through tubular shaft 65. Valves 123, which may be of a three-way construction so as to both introduce fluid to the bags or vent it therefrom, serve to connect the pipes 122 to a suitable source of fluid pressure. Bolts 124 (Fig. 29) serve to hold the rings 113 and 42 in assembled relation to the disks 43.

To draw the clamping rings 42 toward the building flanges each disk 43 is carried upon a disk 125 attached by screws 126 to slides 127. Preferably, in order to permit of a slight rotation of the disks 43 to accommodate themselves to the cord members as these are drawn into position, each disk 43 is carried upon ball bearings 128 upon disk 125. The connection of disks 125 to the slides may be made readily detachable by forming the slots 129 in the disk 125 through which the screws 126 pass with enlarged portions as shown in Fig. 24, so that by unloosening the screws and slightly rotating disks 125 the latter, with the attached parts on disks 43, may be readily removed. Slides 127 are fitted in suitable ways in head 64, and to each set of slides is secured, at the end remote from the transfer apparatus for operation in a cam slot 132 in a sleeve 131, a cam roll 133 which is secured as by a screw 134 to slides 127. An outer sleeve 135, to which sleeve 131 is held as by screws 130, is held against axial movement by a flange 136 abutting a flange 137 on support 66. The outer sleeve can be rotated, as by handles 138, and by means of the cam mechanism described slides 127 will be moved so as to position the disks 43 either separated from the core as in the case of core 31', Fig. 14, or in clamping position as shown in Fig. 17. A plug 139 fitting in holes 140 in the head 64, may be used to retain the parts in either the clamping position of Fig. 17 or the spaced position of Fig. 14. This plug may conveniently be pressed into the holes 140 by a spring 141 mounted in a housing 142 on sleeve 135 and held in place by a cap 143 screwed into place in the housing. To withdraw the plug a handle 144, attached to the plug and passing through an opening in cap 143 may be provided. By the means described the clamping ring and folding bag carried by either of the cores may be moved into position to clamp a bead anchorage against the building flange of that core, or into position to permit of the construction of the cord surface and the application of a bead anchorage between it and the core.

To cut the cords, which as shown in Fig. 16 and 23 extend in a circumferentially complete series between the cores 31 and 31', one of the core supports is fitted with a knife. In the drawings the core support carrying core 31' has been shown as being fitted with a shaft 145 carrying at its end a handwheel 146 by which it can be rotated. At the end remote from the handwheel the shaft is cut down to form a shoulder 147 and has keyed to it upon the reduced position a collar 148 and an arm 149. A cap screw 150 serves to hold the collar and arm in position. Collar 148 has frictionally held upon it by means of a screw threaded clamping ring 151 an annular disk 152 which is clamped to slides 127 by a clamping ring 153 conveniently held to the slides by the screws 126 holding the disk 125. The adjustment of clamping ring 153 is preferably such that the annular disk 152 will be free to rotate relative to the slides but will be constrained to move axially with them, while the adjustment of clamping ring 151 is such that the disk will rotate with a slight friction. Axial motion of the slides will through disk 152 carry the collar 148 along with it. Pivoted at 154 to the arm 149 is a knife 155 having a slot 156 through which extends a guiding pin 157 secured to disk 152. This guiding pin does not appear in Fig. 23 on account of the manner in which that figure is broken to save space. Also secured to disk 152 is a stop pin 158. If the shaft 145 is rotated to turn the arm 149 clockwise as viewed in Fig. 24, and considering the parts in their dotted line position in that figure, the knife will first slide along the guiding pin 157, which because of the frictional mounting of the disk 152 will tend to remain stationary. When the arm reaches the full line position of Fig. 24 the knife has been gradually thrust out into cutting position, and as the arm hits the stop pin 158 the disk 152 will be carried with the arm, the knife remaining in its extended or cutting position. After the knife has traversed a complete circle, and has thereby severed the complete circumferential series of cords extending between the supports, the handwheel is rotated in the reverse direction and the knife drawn back into its inoperative position. During this latter movement the frictional drag on disk 152 serves to hold guiding pin 157 against rotation so that the knife will be guided to the dotted line position of Fig. 24 as will be clearly seen from that figure. The cutting mechanism here described is claimed in a copending application filed by me April 26, 1923, Serial No. 634,733.

From the above description the manner of operating the apparatus to carry out the method will be clear and the steps of the method need not again be set forth. The description of the method previously given can be applied to the operation of the mechanism by bearing in mind that in the mechanism the relative axial motion between the cores and the guiding circumference is controlled by handwheels 82, that relative rotation is controlled by handwheels 73, and that the various motions of the clamping rings 42 are controlled by handles 138.

Having thus described my invention, I claim:

1. A method of building tire carcasses successively which comprises supplying a circumferential series of cords, bringing successive tire building supports into cord laying cooperation with the cord series alternately from opposite sides thereof, and laying lengths of said cords upon the successive supports as they are brought into cooperation with the cord series.

2. In a method of building tire casings wherein cords are supplied in a circumferential series and laid back and forth on a building support to form a tire carcass, that method of transition between the building of successive tires which comprises bringing the successive building supports into cord laying cooperation with the cord series alternately from opposite sides thereof, holding the cords between each pair of consecutive supports for attachment to each of them, and then severing the cord series between the supports.

3. The method of successively building annular tire carcasses which comprises constructing a carcass upon a circular building support from a circumferential series of cord members, applying an encircling annular anchorage about the series of cord members to hold them adjacent one side of the support, applying a second encircling annular anchorage about the series of cord members to hold them adjacent one side of a second support spaced axially from the first, both said anchorages lying between the two supports, severing the series of cord members between the anchorages, folding around the anchorges the free ends of the cord members resulting from the severance, and constructing a carcass upon the second support from the series of cord members.

4. The method of successively building annular tire carcasses which comprises laying under tension to form a carcass a circumferential series of cord members, carrying the series from the bead of the built-up carcass to the adjacent bead line position of a second carcass, holding and securing under tension the cord members adjacent each carcass, severing the series of cord members between the carcasses, and completing the laying under tension of the cord members to form the second carcass.

5. The method of successively building annular tire carcasses which comprises constructing a carcass from a circumferential series of cord members, carrying the series from the bead of the built-up carcass to the adjacent bead line position of a second carcass spaced axially from the first a distance which will provide lengths of the cord members between the carcasses sufficient to anchor the members in the respective carcasses without substantial excess, securing the series in the second carcass, severing the series of cord members between the carcasses, and anchoring in the carcasses the free ends formed by the severance.

6. The method of successively building annular tire carcasses which comprises constructing a carcass upon a circular building support from a circumferential series of cord members, applying an encircling annular anchorage about the series of cord members to hold them adjacent one side of the support, applying a second encircling annular anchorage about the series of cord members to hold them adjacent one side of a second support spaced axially from the first a distance which will provide lengths of the cord members between the carcasses sufficient without substantial excess to anchor the cord members in the respective carcasses by folding around the anchorages, severing the series of cord members between the anchorages, folding around the anchorages the free ends formed by the severance, and building up a carcass upon the second support.

7. The method of successively building tire carcasses which comprises guiding a circumferential series of cord members inwardly at a guiding circumference of constant size, laying the series upon a circular building support by relative movement of the support axially of the guiding circumference, locating a second support axially adjacent the first, securing the series to the second support, severing the material between the supports, and laying the series of members upon the second support by relative motion of that support through the guiding circumference.

8. In a method of building tire casings on a succession of building supports wherein cords are supplied in a circumferential series and are laid back and forth on each building support to form reversely folded layers with an anchorage in each fold, that method of transition between the building of tires on successive building supports which comprises locating a pair of anchorages between each consecutive pair of building supports, holding the cords adjacent said anchorages, severing the cords between the anchorages, and folding around the anchorages the free cord ends thus formed.

9. The method of successively building tire carcasses which comprises guiding a circumferential series of cord members inwardly at a guiding circumference, folding the inner ends of the members around an annular anchorage, positioning the achorage adjacent the bead line of a circular tire building core of generally convex transverse form, carrying the series back and forth across the core in reverse folds by repeated passages of the core through the guiding circumference until the desired number of plies have been laid, restricting the series to the bead circumference of the core and encircling the series with an annular anchorage between each passage, encircling the series with an additional annular anchorage, securing adjacent a second generally convex tire building core such additional anchorage and the portions of the cord members adjacent to it, severing the series of cord members between the cores, folding the cord members around the anchorage on the second core and proceeding in like manner to construct carcasses on the second and succeeding cores.

10. The method of successively building tire carcasses which comprises folding a circumferential series of cord members around an annular anchorage, positioning the anchorage adjacent the bead line of a circular tire building core of generally convex transverse form, carrying the series back and forth over the core in reverse folds until the desired number of plies have been laid, restricting the series to the bead circumference and encircling the series with an annular anchorage after each carrying of the series over the core so that each reverse fold encloses an anchorage, encircling the series with an additional annular anchorage, securing to a second generally convex tire building core such additional annular anchorage and the portions of the cord members adjacent to it, severing the series of cord members between the cores, folding the members around the anchorage on the second core, and proceeding in like manner to construct carcasses on the second and succeeding cores.

11. The herein disclosed process which consists in supplyin material, which is continuous circumferentially, to an annular form, then in positioning said material at substantially all points throughout its circumference upon said form, then in (1) causing relative reciprocatory movements between the form and the source of material supply to either side thereof to fold the material on circumferential lines and dispose it in superposed plies on the form, (2) associating with the material within the lines of fold bead material and (3) positioning the plies upon the form along the lines of fold, then in associating with the material adjacent the bead material for the last fold or ply bead material for the first ply of the succeeding product, then in severing the material circumferentially between the adjacent bead materials just referred to, and finally positioning the material along the circumferential outer end of the last fold upon said form.

12. The herein disclosed continuous process of making tires which consists in laying a tubular fabric upon an annular form, securing the material to one edge of the form, and carrying it across the form to the other edge and there securing it, and repeating these steps, applying bead material within the folds of the fabric at the sides of the form, forming a fold in the fabric and applying a bead material therein close to the final bead of the complete tire, thus producing two beads side by side, and severing the material between the beads, one of the said beads being incorporated in and completing the tire on the form, and the other bead constituting the starting edge of the tire next to be formed.

THOMAS MIDGLEY.